Nov. 13, 1956  R. L. BORDEN  2,770,090
CRABGRASS CUTTING AND RAKING IMPLEMENT
Filed May 15, 1953  3 Sheets-Sheet 1
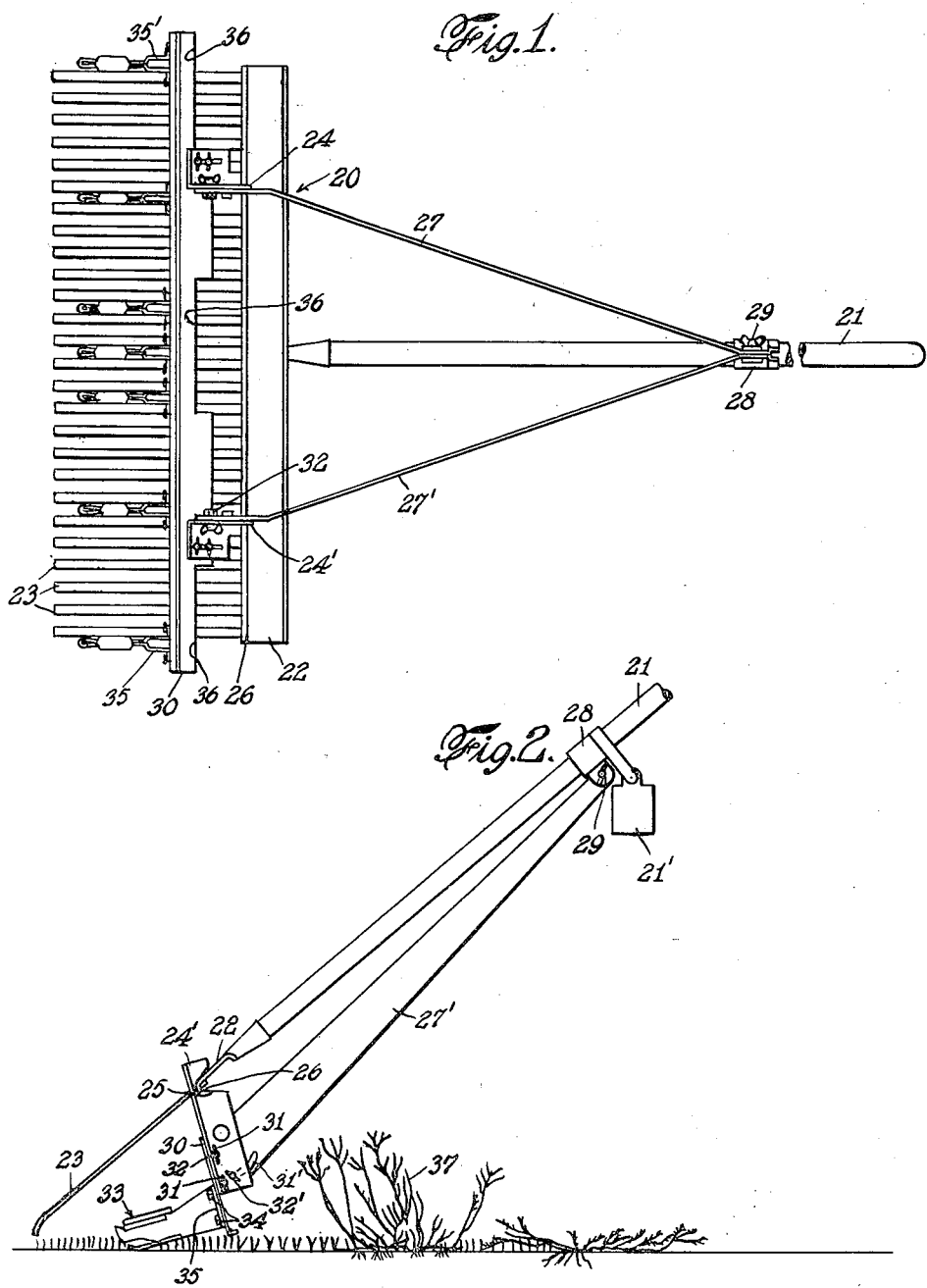
INVENTOR.
ROBERT L. BORDEN
BY
ATTORNEY Nov. 13, 1956 R. L. BORDEN 2,770,090
CRABGRASS CUTTING AND RAKING IMPLEMENT
Filed May 15, 1953 3 Sheets-Sheet 2
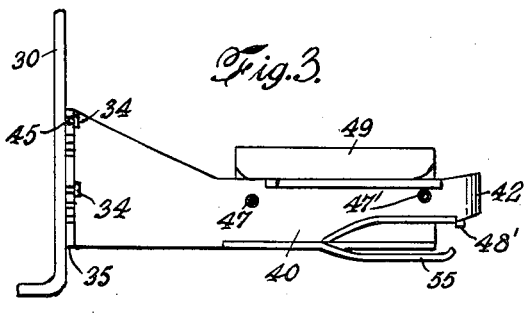
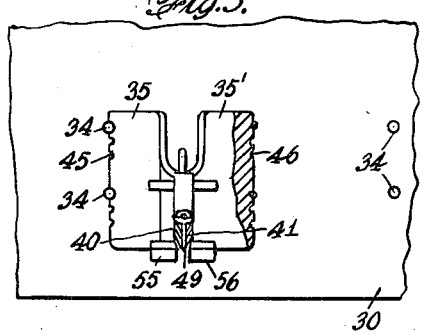
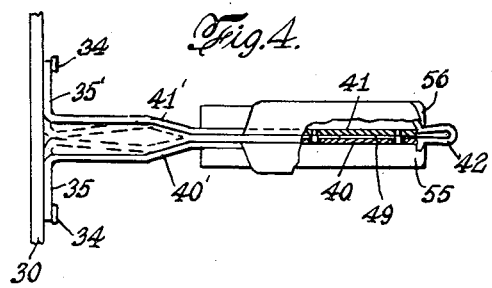
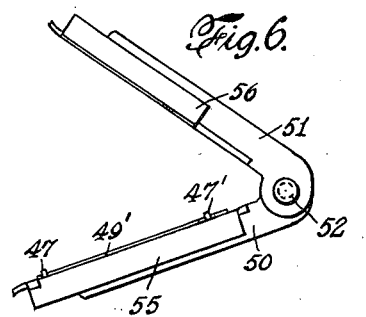
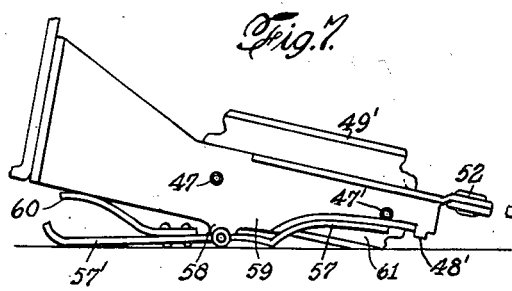
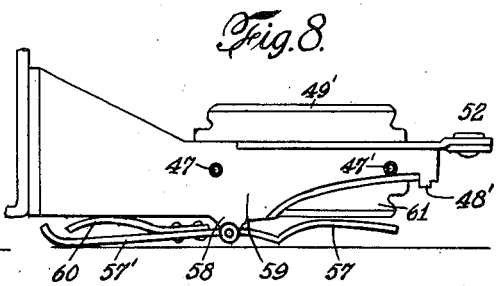
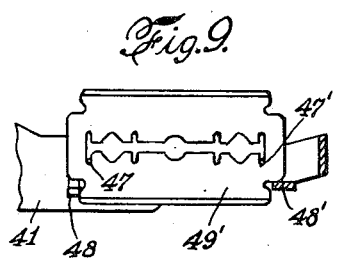
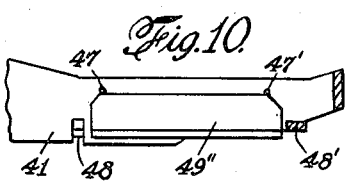
INVENTOR.
ROBERT L. BORDEN
BY
ATTORNEY

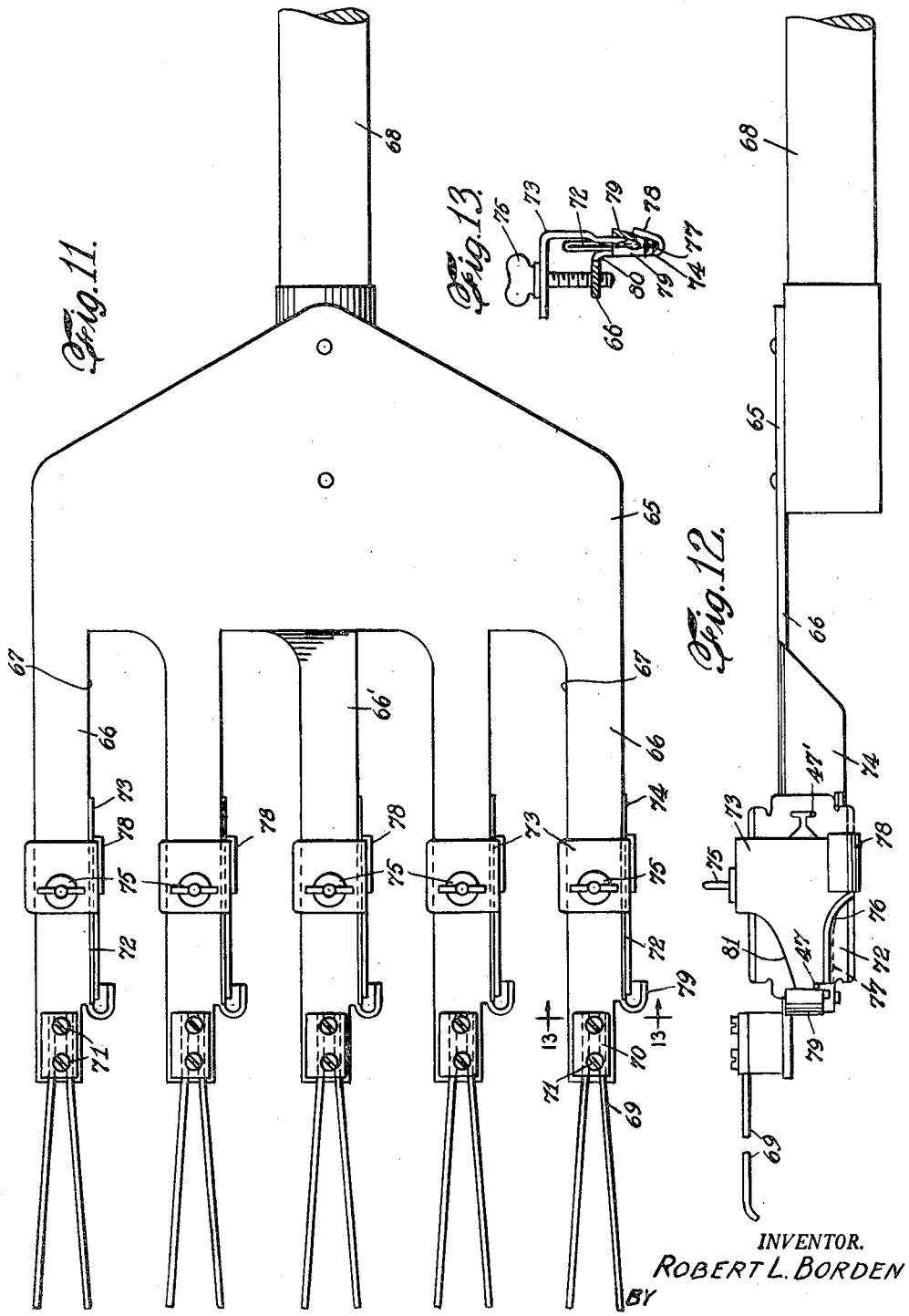

United States Patent Office 2,770,090
Patented Nov. 13, 1956

2,770,090

CRABGRASS CUTTING AND RAKING IMPLEMENT

Robert L. Borden, Garden City, N. Y.

Application May 15, 1953, Serial No. 355,280

10 Claims. (Cl. 56—400.07)

The invention relates to plant (weed) cutters, more especially to cutters for removing objectionable weeds from grass lawns by severing the substantially horizontal branches or stalks of weeds such as crabgrass, dandelions, plantains, wild garlic, wild onion, etc. The two species of crabgrass (*Syntherisma sanguinalis* and *Syntherisma ischaemum*) are perhaps the most objectionable of weeds found in lawns, as well as being heretofore the most difficult to contend with. The use of chemicals, mechanical devices, and processes as heretofore proposed has been only partially satisfactory and in some cases unduly expensive in combatting crabgrass. Thus, in the application of chemicals, this must be effected with considerable thoroughness, at proper intervals, and under special weather conditions; also, before the weeds reach maturity. Mechanical lawn weeders of the rotary cutter type are relatively expensive, while a specially designed crabgrass rake plucks out only large and mature plants which have started dying in the Fall. Moreover, it is not particularly weed-selective and therefore, when the weed is matted in with desirable grass, disfigures the lawn to some extent. Shading with special grasses, or with grasses which are mowed high, to block the sunlight necessary to growth of the crabgrass, has also been proposed, as well as hand plucking and burning. All of the foregoing crabgrass expedients possess one or more of the following objectionable features, viz: laboriousness, partial ineffectiveness, disfiguring tendencies, relatively high expense, and slowness in taking effect, as well as lack of permanent eradication.

It is an object of my invention to provide a manually operable weed cutting device which may be manipulated or stroked over the weed areas of a lawn to sever the horizontally disposed branches of the weeds by a series of generally vertically disposed cutting blades of the device, and without causing appreciable damage to the vertically standing grass.

Another object of the invention is to provide a lawn-weed cutting device in which sharp blades, for example discarded razor blades of various manufacture, may readily be mounted and as readily replaced when no longer effective.

Still another object of the invention is to provide a weed cutting device wherein the cutting elements may be arranged readily according to any desired spacing, as well as adjusted either individually or as a group for use both vertically and angularly with respect to the turf plane over which the device is manipulated.

A further object of the invention is to provide a device which is conveniently attachable to a garden tool, preferably a rake of the resilient prong type, whereby the severed weed branches or stalks may readily be collected along with their attached seeds and both removed.

The invention has for an object, also, to embody the invention in a simple and relatively inexpensive attachment suitable for installation, without the use of any tools, on a manipulating member and to provide for manual replacement of the cutting elements thereof.

In carrying out the invention, a suitable support means is provided for cutter carrying means, said support means being provided with a conventional handle member or the like for manipulation of the novel cutting device by a stroking movement over turf infested with weeds, a downward pressure being exerted manually therewith to sever the branches or stalks of such objectionable weeds.

The cutting elements are in the nature of metal blades, such as discarded or new razor blades, having a single or double edge; and the invention contemplates means for clamping interchangeably blades of various types and manufacture to secure the same to the support means in a generally vertical plane for action, also, in such a manner that, if desirable, a blade may be readily replaceable without the use of tools of any kind. A flexible prong type rake may serve as a support member, thereby affording the additional advantage of being able simultaneously to rake the weed cuttings if said blade-clamping means be positioned between the free ends of the prongs and the user; and provision may be made for operating the rake with its prongs in position solely for raking purpose and the cutter means temporarily inactive. Provision is made, also, for adjustment of the blade-clamping means relatively to its support.

The nature of the invention, however, will best be understood when described in connection with the accompanying drawings, in which:

Fig. 1 is a bottom view of the novel cutting device as combined with a rake provided with flexible prongs, a portion of the handle being omitted.

Fig. 2 is a fragmentary side elevation thereof, illustrating the novel cutter means in position for action.

Fig. 3 is an enlarged, fragmentary side elevation of a blade-clamping means illustrating the same attached to an intermediate support element; and Fig. 4 is a plan thereof with a portion broken away.

Fig. 5 is a similar front elevation with parts broken away and shown in section.

Fig. 6 is a plan view of a modified form of blade-clamping means.

Figs. 7 and 8 are enlarged, fragmentary side elevations of a blade-clamping means and illustrate a modified form of blade cleaning mechanism.

Figs. 9 and 10 are elevational views, with parts broken away and shown in section, of representative blades suitable for use in the cutting device, together with associated elements of the clamping means whereby to key or position properly a blade in its holder.

Fig. 11 is a plan view of a modified form of the implement, and Fig. 12 is a side elevation thereof.

Fig. 13 is a transverse section taken on the line 13—13, Fig. 11 of the drawings, and looking in the direction of the arrows.

Referring to the drawings, more particularly Figs. 1 and 2 thereof, a resilient-metal pronged leaf rake is indicated at 20, said rake being provided with a handle 21 secured at its inner end to a transverse member or prong spacer 22 from which extend the conventional rake prongs 23. Spare blades may conveniently be carried by a suitable container 21', if desired; and the same is then removably slung over the said handle 21. In accordance with the invention, use is made of the spacer 22 as a support member for a plurality of vertically disposed cutting elements such as razor blades, either discarded or new ones, as is hereinafter more fully set forth. The arrangement is such, moreover, that these blades through a suitable clamping means may readily be replaced and the said clamping means be attached to the support member without recourse to any tools. Thus, two or more angular brackets 24, 24' are each provided with a generally V-shaped notch 25 designed to be fitted over the outer edge 26 of prong spacer 22, and braces 27, 27' secured to the respective side walls of the brackets are extended backwardly toward the outer end of handle 21 and terminate in a spring clamping ring 28 designed to embrace handle 21 and be tightly secured thereto by a wing bolt 29 suitable for manual operation. The vertical thrust from the rake to the blade-retaining members and their blades is thereby transmittable in a rigid manner without handicapping the simplicity of installation and removal of the device respectively onto and from the rake. If desired, these brackets may be reversed on the spacer 22 to locate the blade-retaining members on the opposite side of the prongs from that illustrated. This reversed mounting of the blade portion will permit non-simultaneous cutting and raking action.

A transverse support element 30 is carried by a corresponding wall of each of the brackets 24, 24' depending therefrom below the free ends of prongs 23 and being angularly and vertically adjustable with reference to the brackets in a substantially vertical plane through slots 31 and wing bolt 32, and angularly therein through curved slots 31' and wing bolts 32'. As one means of locating a blade-clamping means 33, the outer face of transverse element 30 may be provided with a plurality of paired projections or studs 34 variously positioned thereover and adapted to receive a selected pair of resilient wings 35, 35' of a blade holder, the wings being designed to be snapped thereto for locking engagement therewith. The number of pairs of projections is determined by the maximum number of blade-clamping means to be mounted, thereby enabling blades to be concentrated or distributed across the rake as may be desired.

It is preferred to provide in the transverse element 30 cut-away portions 36 to afford viewing openings enabling the user of the weed cutter to see one or more of the cutting elements for more effective operation of the device, particularly in aiming at conspicuous plants 37, as well as to avoid obstructions while cutting near them.

The blade-clamping means may be variously constructed, and may comprise two halves united at one end so as to simplify the insertion and replacement of blades 49. Reference being had to Figs. 3 to 8, inclusive, a blade-clamping means of this nature is indicated, a hinge connection being provided at juxtaposed ends of a pair of jaw elements. Thus, in the form shown in Figs. 3 to 5, inclusive, the cooperating jaw elements 40, 41 are constructed of resilient material which is doubled upon itself as in providing a 180° bend 42 therein, the shank portions then serving in part as the jaws 40, 41 and are provided with the resilient arms 40', 41' having bent outwardly therefrom the respective wings 35, 35' designed to tension against the projections or studs 34. Notches 45, 46 are provided to this end in the respective edges of the securing wings for engagement with said studs to secure firmly a blade holder to the transverse element 30. To remove such clamping holder, it is necessary merely to exert finger pressure on the wings. When a holder is thus mounted on the said transverse element 30, the reaction force of the studs thereof is transmitted by the said wings to the shanks or jaws to produce a clamping action against a retained blade, located between said jaws, to hold it firmly, as well as to allow of accommodating blades of various thickness.

While it is possible thus to retain blades of various manufacturers between the jaws solely by the aforesaid clamping action, the primary purpose of this action is to reinforce the blade against bending. I prefer to provide means to insure, further, that the blade will not shift vertically in use, for example, by including with a jaw projecting keys 47 and 47' to receive the conventional openings of the blades and also with stops 48, 48' to prevent lateral displacement of injector type razor blades. These keys, furthermore, accommodate the different brands of safety razor blades, for example, such as the blades 49', 49'' shown in Figs. 9 and 10, and whether single or double edge or of the injector type, as shown.

Instead of the blade-clamping means being constructed of a single metal strip doubled upon itself, as hereinbefore set forth, the two jaw elements 50, 51, Fig. 6, may be hinged together as at the pivot point 52.

It is desirable, also, to associate with the blade-clamping means a pair of resilient fingers upon opposite sides of a blade retained in a holder whereby such fingers may be forced upwardly, from a normal position below the lower edge of the blade, when contact is had with the turf. When this contact is then withdrawn, the fingers will be caused to spring back and sweep across the opposite faces of the blade to dislodge from the same any weed cuttings or foreign material which may have accumulated thereon. Such fingers 55, 56 may be rigidly secured at one end to the sides of the respective shanks or jaw elements 40, 41.

However, instead of being fixed at one end along the walls of the jaw elements, rigid fingers may be pivotally attached, as is indicated in Figs. 7 and 8 of the drawings. As shown therein, a finger 57 (only one of which is indicated) is to be provided at each side of the holder, being pivoted to a lug 58 of jaw 59, the rearwardly directed arm 57' of said finger being engaged by a spring element 60. The latter is included between said arm and the lower edge of the jaw and is adapted to force the opposite and finger end upwardly with respect to the blade as pressure is released thereon, as upon tilting the holder into the cutting position. As is indicated in said Figs. 7 and 8, the fingers are caused to wipe the blade when desired by applying force to the arm 57', which may be accomplished by bringing the device from the tipped position, Fig. 7 in which blade 61 contacts the ground, to the horizontal position shown in Fig. 8, spring element 60 being compressed.

In Figs. 11 to 13, inclusive, there is disclosed a modification in the support member as well as in the blade-carrying means whereby a more compact instrument is possible. The support member 65 in this embodiment of the invention comprises a comb-type member having a plurality of parallel blade-carrying teeth 66 with substantial openings 67 provided therebetween. A handle 68 for manual operation of the cutter assembly is secured to the comb in the conventional manner; and if it be desired to associate also rake prongs with the cutter implement, these are conveniently attached to the respective raised free ends of the teeth 66 as is indicated at 69, for example, by a suitable and grooved clamp 70 retained by screws 71. The blade 72 in this embodiment is retained by an angle clamping element 73 and a downturned flange 74 of the teeth 66 respectively designed to form the jaws of the blade-clamping means, the one arm of element 73 being designed to extend over the top of a corresponding tooth and being removably secured thereto by means of a flanged wing-screw or the like 75 passable through the arm and threadable into a said tooth. This element 73, moreover, is beveled along its lower edge 76, and cut away in part to expose a lower corner of blade 72 for cutting purposes. The other jaw 74 likewise has its lower edge 77 cut away to clear the said blade corner and, furthermore, is turned over at the edge to provide a bottom channel section 78 and a lateral channel section 79 to seat respectively the beveled portion 76 and to afford a stop for the blade. When the jaw element 73 is then clamped against jaw 74 with blade 72 between, by threading the screw 75 into a tooth 66, sufficient pressure by the action of the bevel is exerted to clamp rigidly blade 72 in place. A blade may be conveniently inserted or replaced thus, by correspondingly manipulating the wing-screw to release the pressure and push laterally the blade, passing it over keys 47 and 47'.

The jaw element 74 to this end is provided with a forward and upper cut-out section 80 and the jaw element 73 with a similar cut-out section 81 to permit access with fingers to push an inserted blade laterally for removal and replacement without necessitating removal or complete separation of the cooperating jaw elements 73, 74.

By depressing one or more of the teeth, as is indicated in the case of the tooth 66′, a further control is had in the cutting operation, as is hereinafter set forth, by the corresponding blade contacting the turf ahead of the others.

The operation of this novel device is based upon the characteristic of crabgrass (*Syntherisma sanguinalis* and *Syntherisma ischaemum*) whereby its stalks grow horizontally and are much stiffer than those of basic grasses. Another trait by which it defends itself against conventional mowing is the tendency of the *Syntherisma sanguinalis* to form a root at each node or joint so as to form a network. It has one major weakness to be exploited: the fact that it is strictly an annual, reproduced solely from seeds. A device which cuts in the vertical plane can detach not only the unsightly stalks but the seeds which will cling thereto.

In the use of the novel cutting implement, several advantages not widely evident in the prior art are apparent. Not only does it afford a scientifically sound means for inhibiting reproduction of crabgrass, but the immediate effect on lawn appearance gives great satisfaction to the home gardener. Also, its season of usefulness is very long. If the implement is used early in the season (July and August), the crabgrass is harassed so as to arrest its dominating tendency. Although new seeds will grow at this time before the plant dies, they will not drop until much later than usual. Due to the tenacity with which crabgrass seeds cling even to dead branches, however, effective treatments can commence in the Fall. The implement also affords a means to find crabgrass for the user and create bare spots which are already partially cultivated for seeding with desirable grass.

It will be noted that weeds frequently grow close to structures, shrubs or sidewalks, so that blades must be mounted at the extreme outside edges of the implement to permit access to the weeds. If the weeds are sparsely distributed, most of the blade-clamping means may be quickly removed from or raised with respect to the support member to leave only a few of said means, for example one in the center and one at each end of the support member. When raised to their extreme upward position, the blade-clamping holders are rendered ineffective or "stowed." Frequently the center blade or outside blades are aimed at conspicuous plants and it is desirable that these blades be lower than the secondary blades. This is another reason for providing the vertical adjustment in the type of blade-clamping means illustrated in Figs. 1 and 2. These blades are frequently used for aiming, and this aiming function is facilitated also by having these holders visible to the user while in operation.

After a period of use, some blades will become worn and occasionally broken. When this occurs, there are three ready alternatives which require no tools. With the removable type of clamping holder, the most convenient of these is to raise or remove the holder of the worn blade and lower one which has been stowed as a spare, interchanging the two holder locations, if desired. If no spares are stowed on the support member, the user can almost as quickly reverse the blade (or also invert it, in the case of double-edged blades) by removing the holder briefly from the support member. If all corners of the blade have become worn, it can be replaced with a fresh one. Replacement razor blades need not be new but could be discards which are too worn for shaving use. Special rugged blades (not shown) may, of course, be inserted, the same being designed specifically for weed cutting, possibly having serrated cutting edges. Rugged blades are particularly desirable for stony soil.

Although very satisfactory use can be made of this novel cutter implement in midsummer, the time of year for most efficient use extends (for the New York City area) from late September to mid-November. The crabgrass plants are not able to recuperate from cutting during this period, and grow very few new seeds. The weather is not too hot for lawn work and the weed has begun to yellow and become conspicuous. However, the seeds will not cling to the stalks very late in the season if there is much rain or snow. Even in a dry Fall, the seeds will begin dropping by the end of September (New York City area) if the plants have been allowed to mature undisturbed. This is the last date at which treatments may be started with maximum value against reproduction of the weed. Although it is not essential that the turf be dry for operation of the novel implement, it is most effective at this time because the roots are firmly anchored. The weed is also most aggressive in such weather, when the conventional crabgrass rake is least effective.

The weeds will be detected more easily after mowing the lawn with conventional mowers. This preparatory mowing may lead to spreading of the weed, however, if all the cuttings are not collected in a grass catcher attached to the mower. After the weed stops recuperating, the patches can be re-seeded if necessary with desirable grasses. Then the seedlings will not be disturbed later by further weed cutting. As a matter of fact, the seeds can be sown before cutting, and worked into the soil by the action of the blades.

I claim:

1. A lawn-weed cutting implement, comprising a rigid prong-support and spacer member; an operating handle fixed thereto for manipulation of the implement; flexible rake prongs carried by the support member to extend therefrom in a direction opposite that of the handle; and blade-carrying means attached to the support member including means for retaining rigidly, for operation, cutting blades in a substantially vertical plane when the implement is drawn manually by the operating handle, with downward pressure exerted thereon, over turf infested with weeds, the severed weed portions being collected by said rake prongs.

2. A lawn-weed cutting implement according to claim 1, wherein means are provided to connect the blade-carrying means reversibly on the support member.

3. A lawn-weed cutting implement according to claim 1, wherein the blade-carrying means include positioning keys to engage the blades.

4. A lawn-weed cutting implement according to claim 1, wherein the support member is in the nature of a comb, the prongs being attached to the respective outer ends of the teeth of said comb and the blade-carrying means are secured to said teeth between the free ends of said prongs and the free end of the operating handle.

5. A lawn-weed cutting implement according to claim 4, wherein the teeth are spaced a substantial distance apart to afford openings to permit of viewing the blades in action.

6. A lawn-weed cutting implement according to claim 1, wherein the blade-carrying means include separable clamping jaw means adapted to receive blades and are provided with means to retain the same firmly therebetween against bending and displacement.

7. A lawn-weed cutting implement according to claim 1, wherein the blade-carrying means include separable jaw means, together with manually operable means for clamping the jaw means firmly together.

8. A lawn-weed cutting attachment for manually operable rakes provided with flexible prongs having a transverse prong-spacer and a handle, said attachment comprising bracket means adapted to engage said prong-spacer and including a support element adapted to extend transversely so as to cross the prongs beneath the same and between the ends of said prongs and the free end of the operating rake handle; means to secure said bracket means to the rake handle beyond the prong-spacer to hold said bracket means and the support element firmly to the rake and prevent displacement relatively thereto; and blade-clamping means secured to the bracket means to maintain blades in substantially vertical planes, when the blades are manipulated over turf infested with weeds, whereby to sever the latter for collection by said rake prongs.

9. A lawn-weed cutting attachment according to claim 8, wherein the blade-clamping means comprise jaw means having flexible extensions, and the support element is provided with studs between which said extensions are adapted to fit to retain said jaw means thereto and simultaneously to close the jaw means to retain a blade therebetween.

10. A lawn-weed cutting attachment according to claim 8, wherein means are provided to adjust the support element with respect to the prongs.

References Cited in the file of this patent

UNITED STATES PATENTS

| | | | |
|---|---|---|---|
| 607,383 | Loree | July 12, | 1898 |
| 1,277,998 | Niemoth | Sept. 3, | 1918 |
| 1,537,005 | Carson | May 5, | 1925 |
| 2,208,880 | Daggett | July 23, | 1940 |
| 2,314,685 | Brooke | Mar. 23, | 1943 |
| 2,469,012 | Smith | May 3, | 1949 |